(12) United States Patent
Stubner et al.

(10) Patent No.: US 7,640,961 B2
(45) Date of Patent: Jan. 5, 2010

(54) APPARATUS AND METHOD FOR MAKING A TUBULAR COMPOSITE BARREL

(75) Inventors: Steve Stubner, Bonita, CA (US); Joseph Irrgang, San Diego, CA (US); Steve Holt, Chula Vista, CA (US); Alan Douglas, Chula Vista, CA (US)

(73) Assignee: ROHR, Inc., Chula Vista, CA (US)

( * ) Notice: Subject to any disclaimer, the term of this patent is extended or adjusted under 35 U.S.C. 154(b) by 0 days.

(21) Appl. No.: 12/052,968

(22) Filed: Mar. 21, 2008

(65) Prior Publication Data

US 2009/0236779 A1    Sep. 24, 2009

(51) Int. Cl.
| | |
|---|---|
| B29D 22/00 | (2006.01) |
| B65C 3/16 | (2006.01) |
| B29C 53/00 | (2006.01) |
| B29C 65/00 | (2006.01) |
| B41B 11/56 | (2006.01) |
| B41B 11/54 | (2006.01) |
| B28B 7/28 | (2006.01) |
| B28B 7/00 | (2006.01) |

(52) U.S. Cl. .................. 156/443; 156/213; 156/215; 156/218; 156/173; 156/175; 156/425; 249/161; 249/171; 249/185; 425/442

(58) Field of Classification Search .................. 249/56, 249/57, 82, 139, 152, 153, 155, 159, 160, 249/161, 162, 163, 168, 169, 170, 171, 184, 249/185, 186; 156/95, 96, 97, 110.1, 112, 156/113, 184, 189, 190, 191, 212, 213, 215, 156/217, 218, 242, 245, 443, 500, 501, 502, 156/503, 173, 175, 425, 429; 425/182, 186, 425/188, 189, 330, 441, 442, 450.1, 451, 425/451.5, 451.9, 468
See application file for complete search history.

(56) References Cited

U.S. PATENT DOCUMENTS 1,835,986 A    12/1931    Heston (Continued)

FOREIGN PATENT DOCUMENTS

DE    1 262 570    3/1968

(Continued)

OTHER PUBLICATIONS

American Solving, Inc. "Rig Set Modular Air Bearing System" [online], retrieved from the Internet: http://www.solvinginc.com/rig_set_modular_air_bearing_syst.htm>.

(Continued)

*Primary Examiner*—Jeff H Aftergut
*Assistant Examiner*—Brian R Slawski
(74) *Attorney, Agent, or Firm*—Womble Carlyle

(57) ABSTRACT

A 360° tool for making a one-piece composite tubular structure, such as a skin of an acoustic liner, is adjustable between a molding position and a non-molding position. The tool includes a base, a fixed segment mounted to the base, first and second doors hingedly connected on either side of the fixed sector, and third door hingedly connected to the second door. The third door has a circumferential extent that is less than one-fourth that of either the first or second door. Sealing members are provided between the doors. Collectively, the fixed sector, and the first, second and third doors have a predetermined shaped surface that corresponds to a portion of the contour of the tubular structure to be formed. After composite material is applied on the outer surfaces of the fixed sector and the doors, a vacuum bag is formed to surround the composite material and also the joint areas on the inner surface of the tool. The entire tool may be placed in an autoclave for curing. The tool may also be used for the layup and bonding of an acoustic core sandwiched between pre-cured skins.

18 Claims, 14 Drawing Sheets

U.S. PATENT DOCUMENTS

| | | | |
|---|---|---|---|
| 2,586,300 A * | 2/1952 | Campbell | 425/54 |
| 3,768,954 A * | 10/1973 | Marsh et al. | 425/451 |
| 4,122,672 A | 10/1978 | Lowrie | |
| 4,278,490 A | 7/1981 | Pistole et al. | |
| 4,288,277 A | 9/1981 | Siilats | |
| 4,436,574 A | 3/1984 | Long et al. | |
| 4,462,787 A * | 7/1984 | Bogardus et al. | 425/402 |
| 4,610,422 A | 9/1986 | Kraiss | |
| 4,861,247 A * | 8/1989 | Schimanek | 425/11 |
| 5,022,845 A * | 6/1991 | Charlson et al. | 425/403 |
| 5,228,374 A * | 7/1993 | Santeramo, Sr. | 83/438 |
| 5,266,137 A | 11/1993 | Hollingsworth | |
| 5,768,778 A | 6/1998 | Anderson et al. | |
| 6,123,170 A | 9/2000 | Porte et al. | |
| 6,458,309 B1 | 10/2002 | Allen et al. | |
| 6,755,280 B2 | 6/2004 | Porte et al. | |
| 7,125,237 B2 | 10/2006 | Buge et al. | |
| 2003/0164438 A1* | 9/2003 | Meinrad | 249/139 |
| 2004/0065775 A1* | 4/2004 | Buge et al. | 244/53 R |
| 2006/0225265 A1 | 10/2006 | Burnett et al. | |
| 2008/0031996 A1* | 2/2008 | Mamada | 425/546 |

FOREIGN PATENT DOCUMENTS

| | | |
|---|---|---|
| DE | 1262570 B * | 3/1968 |
| DE | 1504597 | 5/1969 |
| DE | 2 259 690 | 6/1974 |
| DE | 23 52 373 | 4/1975 |
| DE | 2352373 A * | 4/1975 |
| EP | 0184759 | 6/1986 |
| WO | WO 92/14672 | 9/1992 |
| WO | WO 2005123358 A1 * | 12/2005 |

OTHER PUBLICATIONS

Partial European Search Report dated Feb. 5, 2007 in EP Appln. No. 06019100.4-1253.

Extended European Search Report dated Apr. 2, 2007 in EP Appln. No. 06019100.4-1253.

* cited by examiner

APPARATUS AND METHOD FOR MAKING A TUBULAR COMPOSITE BARREL

CROSS REFERENCE TO RELATED APPLICATIONS

None.

BACKGROUND OF THE INVENTION

The present invention is related to a method and apparatus for making tubular composite articles, such as an acoustic liner for an aircraft nacelle.

An acoustic inlet barrel for a nacelle inlet may comprise a number of layers, including a perforated inner skin, an acoustic core, and an impervious outer skin. Typically, the inner skin is formed from sectors that are bolted together at axially extending seams. Ideally, however, the perforated skin has no internal seams or other features which may degrade the acoustic performance of the barrel.

U.S. Pat. No. 7,125,237 discloses a tool for molding an air intake, and more specifically for forming a one-piece inner skin having no internal seams. The tool comprises a mandrel having four arcuate sectors, a fixed sector that does not move during normal operation to the tool, two movable articulated sectors each hingedly connected to either side of the first sector; and a movable key sector which is independent from the other sectors and insertable between the articulated sectors. By virtue of the hinges, the articulated sectors remain connected to the fixed sector and cannot be separated therefrom. Locks are provided to secure the key sector to the articulated sectors. When in the molding position, the four sectors together define, by their external surfaces, a continuous surface corresponding to the internal surface of an air intake. A control device, disconnectable from the mandrel, may be used to adjust the movable sectors between a molding position and an non-molding position.

U.S. Published Patent Application No. 2007/0062022 discloses a tool for making a composite tubular structure. The tool includes a base on which are mounted a plurality of sectors, each sector having an outer panel provided with a predetermined shaped surface. The predetermined shaped surface corresponds to a portion of the contour of the tubular structure to be formed. At least one of the sectors is fixed relative to the base while the remaining sectors are movable in a radial direction and separable from all the other sectors. The sectors are provided with air bearings to facilitate movement along a radial direction. Splice plates are used to form a joint between the outer panels of adjacent sectors.

SUMMARY OF THE INVENTION

In one aspect, the present invention is directed to a tool for making a tubular composite barrel, the tool being adjustable between a molding position and a non-molding position. Such a tool includes a base, at least one fixed segment that is fixed relative to the base, the at least one fixed segment having a first circumferential end and a second circumferential end, a first door having a first circumferential end hingedly connected to the first circumferential end of the at least one fixed segment, a second door having a first circumferential end hingedly connected to the second circumferential end of the at least one fixed segment, and a third door hingedly connected to the second door and configured to fit between the second door and first door and complete the 360° circumferential extent of the tool. A sealing member is positioned between the at least one fixed segment and each of the first and second doors, and also between each of the first and second doors and the third door. In such a tool, the third door has a circumferential extent no greater than one-quarter of a circumferential extent of the smaller of the first and second doors. The base may be formed from a first material, with the at least one fixed segment, and the first, second and third doors are all formed from a second material different from the first material.

In another aspect, the present invention is directed to a method for molding a tubular composite inner skin for an acoustic inner barrel. The inventive method comprises providing the aforementioned tool, adjusting the doors until the tool is in the molding position, applying composite material on the outer surface of the tool, curing the composite material to form an inner skin, and removing the inner skin from the outer surface.

In yet another aspect, the present invention is directed to method for molding a tubular composite bond panel for an acoustic inner barrel. The inventive method comprises providing the aforementioned tool, placing a tubular composite inner skin over the tool while at least one of said first and second doors is in an inwardly articulated position, positioning an acoustic core over the inner skin and bonding the acoustic core thereto, positioning an outer skin over the acoustic core and bonding the outer skin thereto, curing the resulting assembly, and removing the bonded inner skin/core/outer skin composite structure from the tool.

In still another aspect, the present invention is directed to a 360° tool for making a 360° composite tubular structure, the tool being adjustable between a molding position and a non-molding position. The tool comprises a base and at least one fixed segment that is fixed relative to the base, the at least one fixed segment having a first circumferential end and a second circumferential end. The tool further comprises a first door having a first circumferential end hingedly connected to the first circumferential end of the at least one fixed segment, a second door hingedly connected to the first door and configured to fit between the first door and the second circumferential end of the fixed segment to thereby complete the 360° circumferential extent of the tool. In addition, a sealing member is present between the at least one fixed segment and each of the first and second doors and also between the first door and the second door, and the second door has a circumferential extent no greater than one-quarter of a circumferential extent of the first door.

DETAILED DESCRIPTION OF THE INVENTION

The contents of aforementioned U.S. published Patent Application No. 2007/0062022 are incorporated by reference to the extent necessary to understand the present invention.

Figure 1:
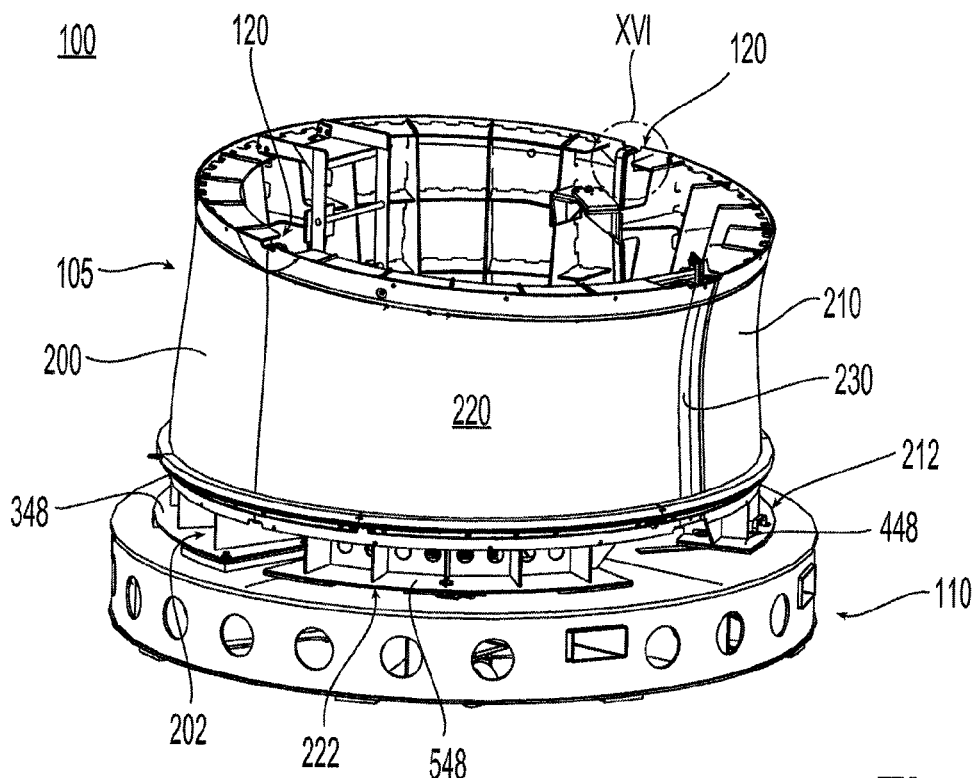
FIG. 1 is a side perspective view of one embodiment of a tool in accordance with the present invention in the molding state.
Figure 2:
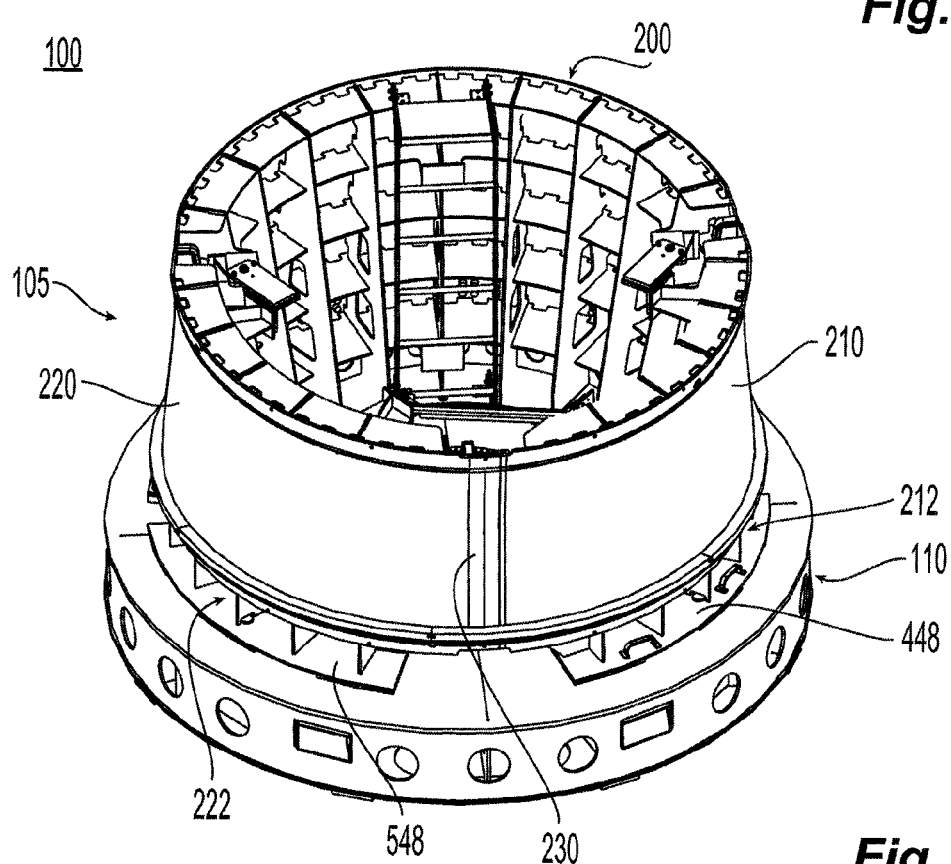
FIG. 2 is a top perspective view of the tool of FIG. 1.
Figure 3:
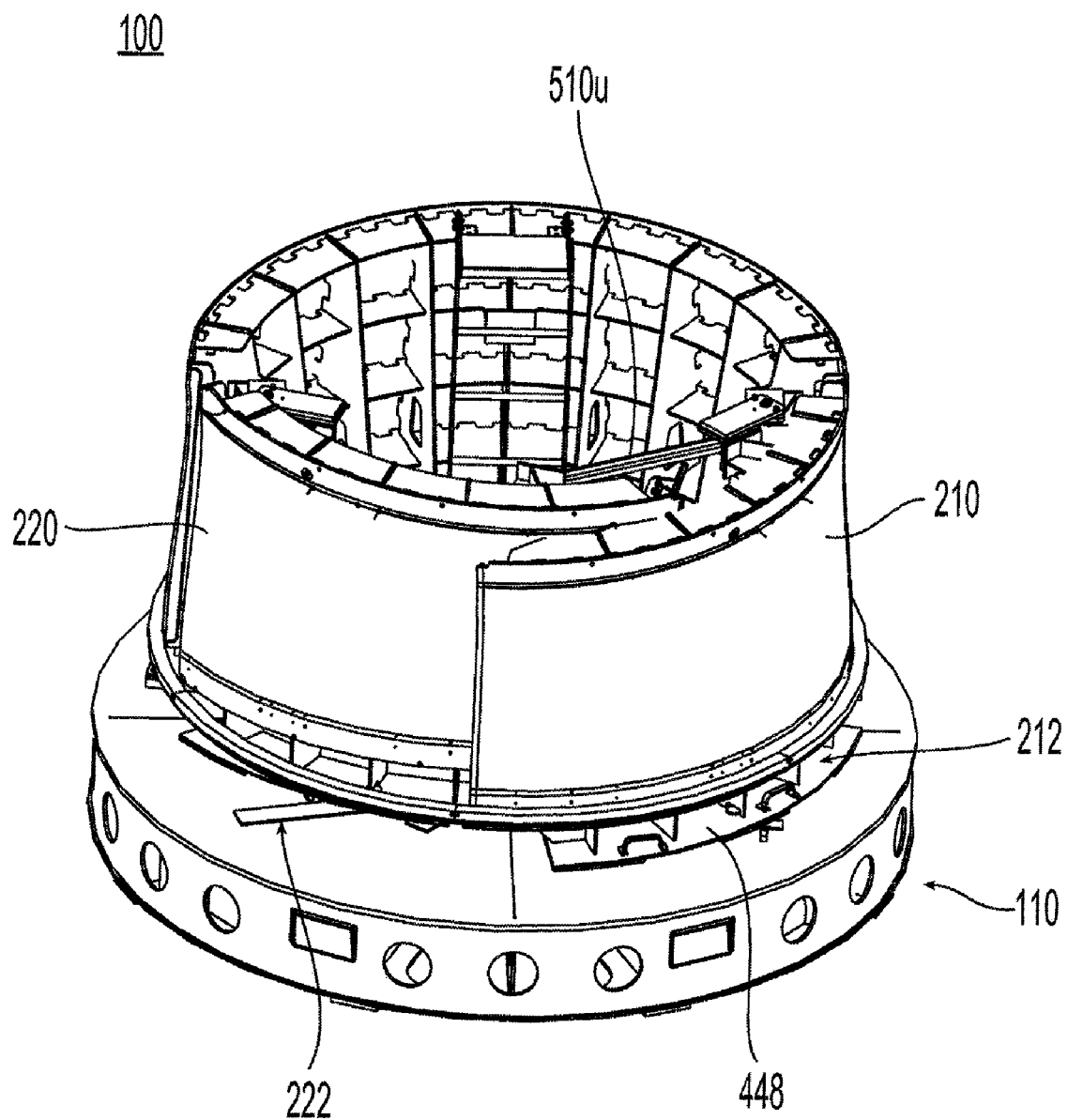
FIG. 3 is a side perspective view of the tool of FIG. 1 with the first and second doors opened inwards into a retracted state of the tool.

FIGS. 1 and 2 show two perspective views of a tool 100 in accordance with the present invention. As seen in FIGS. 1-2, the tool is in the "molding" state—i.e., the tool 100 is ready to have one or more layers of composite material applied to its axially extending tubular exterior surface to form a tubular composite member, such as an inner skin of an acoustic inner barrel for an aircraft gas turbine engine. In contrast, FIG. 3 shows the tool 100 in the "collapsed" state, in which a tubular composite member formed on the tool may be removed from the tool.

The tool 100 comprises a base 110 on which is mounted a tubular molding assembly 105. In one embodiment, the base has a diameter of approximately 3.4 meters while the height of the tool, including the base, is approximately 3.1 meters.

Figure 17A:
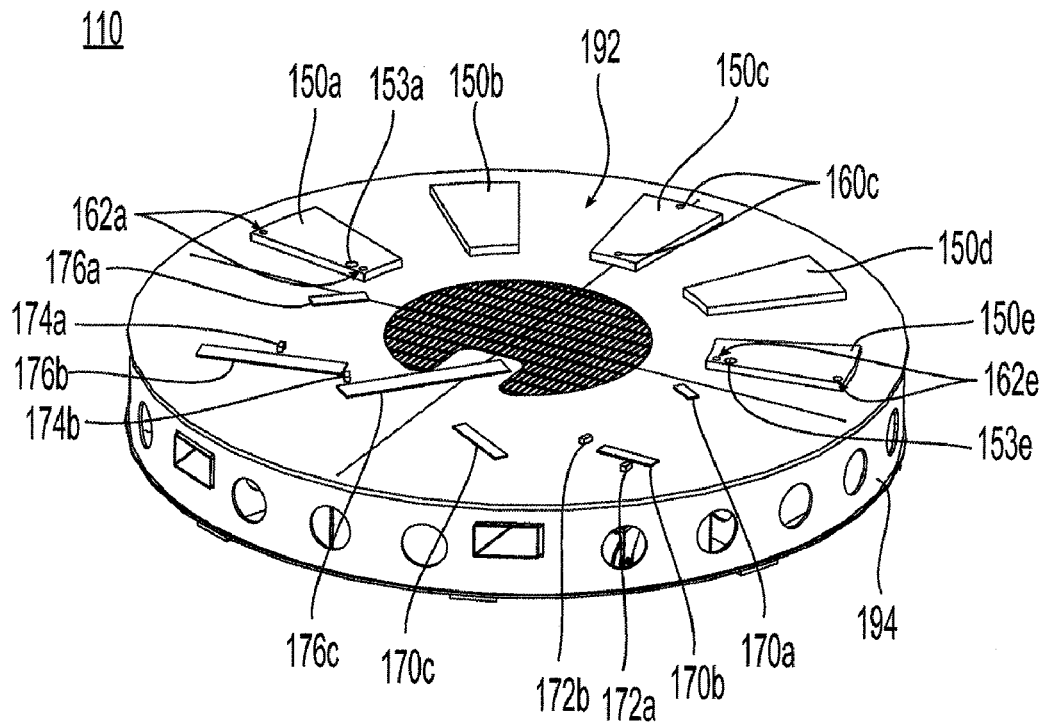
FIG. 17A is a perspective view of the top side of the base.
Figure 17B:
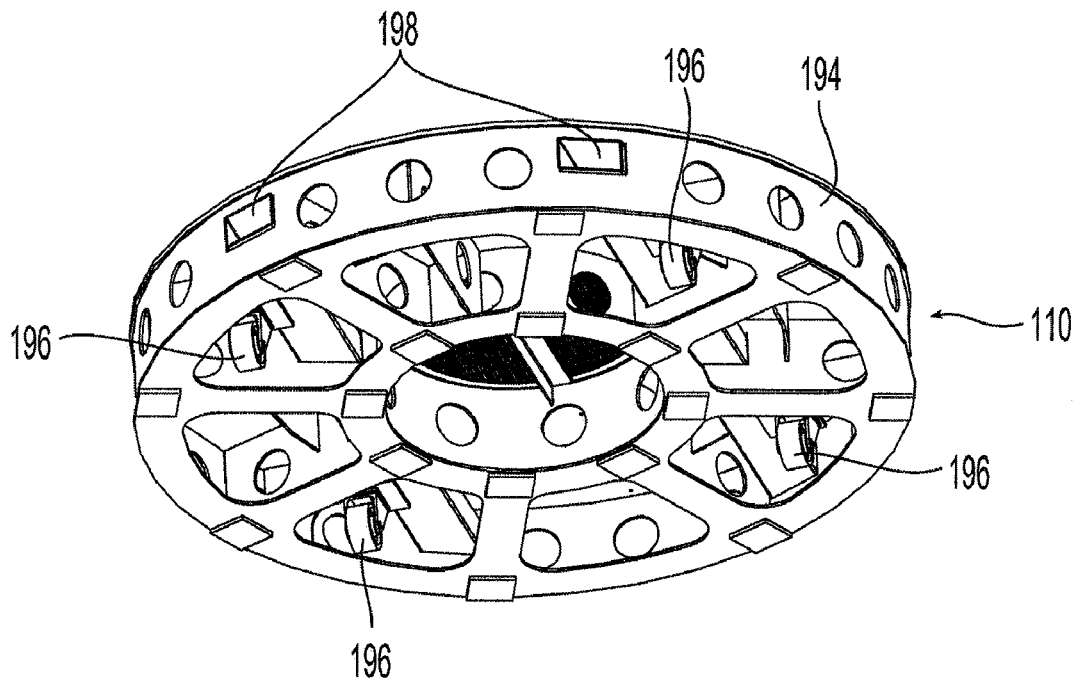
FIG. 17B is a perspective view of the underside of the base.

As best seen in FIGS. 17A and 17B, the base 110 is circular in shape and comprises an upper surface 192 and a skirt 194 extending downwardly therefrom. A set of four wheels 196 is attached to the bottom of the base 110 to help roll the base along a floor or other surface on which the base 110 rests. The base 110 is also provided with at least one pair of rectangular tubular members 198, each tubular member traversing the base 110 in a chord-like manner. The tubular members 198 are configured and dimensioned to serve as forklift receiving structures suitable for receiving forklift prongs, to facilitate lifting and transporting the base 110.

The tubular molding assembly 105 comprises a fixed segment 200, and three movable segments 210, 220 and 230. In this context, the term "fixed segment" refers to a segment which, in normal use for molding and curing operations, is fixed relative to the base 110. In one embodiment, movable segments 210, 220 and 230 are configured as a first door 210, a second door 220 and a third door 230, respectively. As seen in FIGS. 1-2, the fixed segment 200 rests on fixed segment support 202 which comprises a fixed segment support base 348; the first door 210 rests on first door support 212 which comprises a first door support base 448; and the second door 220 rests on second door support 222 which comprises a second door support base 548.

The first door 210 is hingedly connected at one circumferential end to a first, opposing circumferential end of the fixed segment 200. Similarly, second door 220 is hingedly connected at one circumferential end to a second, opposing circumferential end of the fixed segment 200. The third door 230 is hingedly connected to the second door 220, as described further below.

During normal use, a door 210, 220, 230 is considered to occupy a 'molding position' when it is closed, such as seen in FIGS. 1 and 2, and is considered to occupy a 'retracted position' whenever it is moved in an inward direction relative to its 'molding position', as seen in FIG. 3. In the present application, we refer to the entire tool as being in a 'molding position' when all of the doors are closed; we refer to the entire tool as being in a "collapsed position" when any one of the doors is opened; and we refer to the tool as being in an "non-molding position" when all of doors have been opened.

In one embodiment, the base 110 is formed from steel while the tubular molding assembly 105 is formed from a different material. In general, the tubular molding assembly 105 is formed from a material which has a thermal properties that are similar to that the material to be formed on the tool, over a temperature range to which the assembly is exposed during normal use. In one embodiment, the tubular molding assembly 105 is formed from INVAR 36® or other material having a coefficient of thermal expansion that is similar to that of a graphite-epoxy composite part that is to be molded on the tool. Having similar thermal coefficients of expansion of the tubular molding assembly 105 and such a part eliminates different thermal expansion rates which otherwise would cause thermal loading between the part and the tool during heating and/or cooling, resulting in damage to the part. In one non-limiting example, the thermal coefficients of expansion of the tubular molding assembly 105 and the graphite-epoxy composite part formed thereon differ by less than 10% over the temperature range to which the assembly is exposed during normal use. Furthermore, a base formed from steel is less costly than a base formed from a material such as INVAR 36®.

The fixed segment 200 and each of the doors 210, 220, 230 has an outer surface provided with a predefined contour which conforms to a corresponding portion of the composite tubular structure to be formed using the tool 100. The third door 230 fits between facing edges of the first door 210 and the second door 220. And as seen in FIGS. 1-2, the outer surface of the third door 230 forms a portion of an outer contour of the tool, when the tool is in the molding position. The third door 230 is constructed and arranged to provide the exterior of the tool 100 with a smooth outer surface in the region between the first door 210 and the second door 220. One way to characterize the smoothness of the outer surface at the interface between the third door 230 and either the first door 210 or the second door 220, is with reference to the maximum step difference along the abutting edges. Minimizing the step difference helps promote the aerodynamic properties of the completed part. In one embodiment, this step difference is less than about 0.05 cm. More preferably, however, the step difference is on the order of less than 0.005 cm.

The third door 230 should be smaller than either the first or second doors 210, 220. In part, one function of third door 230 may be to break surface tension of a cured product by initiating separation between the cured product and the outer surface of the tool mandrel on which it is formed. Thus, the size of the third door may be dictated by the surface area required to break tension, and this may depend on the size of the tool. Thus, for example, the third door 230 may subtend a smaller circumferential extent in a tool with a larger diameter, than in a tool with a smaller diameter. Furthermore, the third door 230 must provide enough clearance to allow the second door 220 to move past the end of the first door 210, in view of the contours of the first and second doors.

In one embodiment, the fixed segment 200 subtends between 160° and 180°, though more preferably is closer to 180°. In one preferred embodiment of the tool 100, the fixed segment 20 subtends just under 180°, the first door 210 and second door 220 each subtend approximately, 87°, and the third door 230 subtends approximately 6°. Thus, in a tool having a diameter of 300 cm (3 meters) at a point midway between the tool's upper and lower rims, the third door 230 has a medial circumferential extent of approximately 15 cm. In other embodiments, the third door 230 subtends between 3°-9° out of the full 360° extent of the tool 100. In still other embodiments, the third door 230 has a circumferential extent no greater than one-quarter of a circumferential extent of the smaller of the first door 210 and the second doors 220. More preferably, though, the third door 230 has a circumferential extent no greater than one-tenth of a circumferential extent of the smaller of the first door 210 and the second door.

Figure 4:
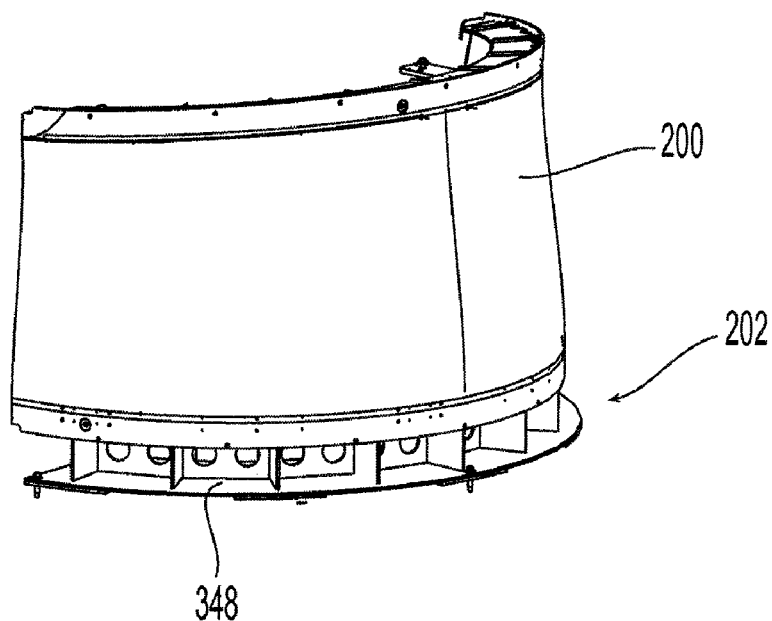
FIG. 4 is an outside view of the fixed segment.
Figure 5:
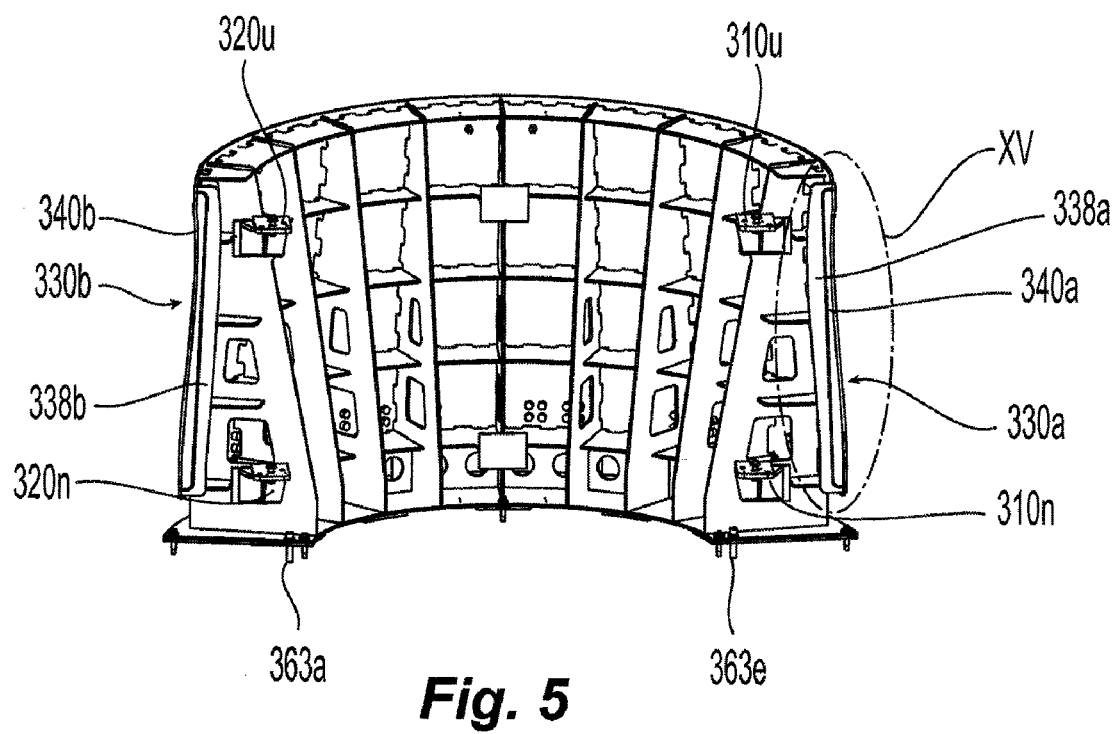
FIG. 5 is an inside view of the fixed segment.
Figure 6:
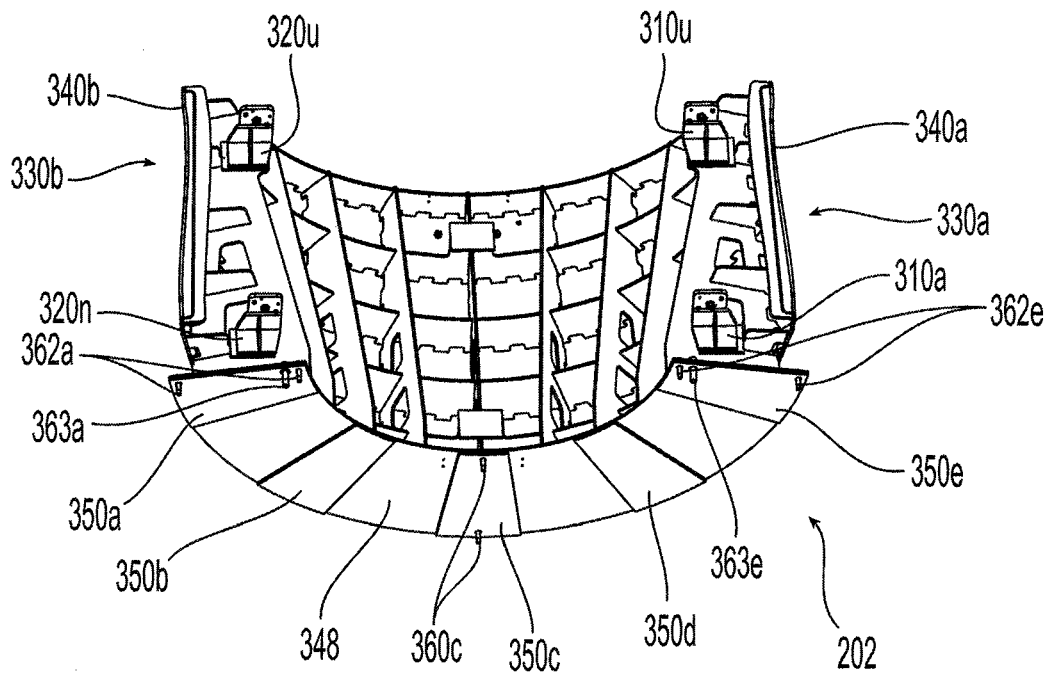
FIG. 6 is an inside view of the fixed segment, looking from below.

FIGS. 4-6 show the fixed segment 200, its fixed segment support 202, and its fixed segment support base 248 in further detail. The fixed segment 200 has a first circumferential end 330a which is opposite a corresponding first circumferential end 430a of the first door 210 (See FIG. 8) and a second circumferential end 330b which is opposite a corresponding circumferential end 530b of the second door 220 (see FIG. 11), when the tool 100 is in the molding position. The circumferential ends 330a, 330b of the fixed segment 200 are each provided with a circumferentially facing panel 338a, 338b, respectively. Each of these circumferentially facing panels 338a, 338b is provided with a sealing structure 340a, 340b, respectively to help form a seal between the fixed segment 200 and each of the first door 210 and the second door 220. In one embodiment, each sealing structure is configured as a groove, as discussed further below with respect to FIG. 15.

As seen in FIGS. 4 and 5, proximate its first circumferential end 330a, the fixed segment 200 is provided with a pair of vertically spaced apart hinge plates 310u, 310n, which connect to opposing vertically spaced apart hinge arms 420u, 420n, respectively, formed on the first circumferential end 430a of the first door 210. Similarly, proximate its second circumferential end 330b, the fixed segment 200 is provided with a pair of vertically spaced apart hinge plates 320u, 320n, which connect to opposing vertically spaced apart hinge arms 520u, 520n, respectively, formed on the first circumferential end 530b of the second door 220.

FIG. 6 shows the details of the fixed segment support 202 and the fixed segment support base 348. The fixed segment support base 348 has a lower surface to which are affixed a plurality of machined pads 350a-e. The machined pads 350a-e are mounted on corresponding mounting pads 150a-e formed on the top surface 192 of the tool base 110 (see FIG. 17A). In one embodiment, five such machined pads 350a-e are provided on the fixed segment support base 348 and five corresponding mounting pads 150a-e are provided on the tool base 110.

Central machined pad 350c is provided with a pair of radially spaced apart clearance holes through which threaded shoulder bolts 360c pass for mating with a pair of radially spaced tapped holes 160c formed on central mounting pad 150c provided on the tool base 110. Lateral machine pads 350a, 350e are provided with radially spaced apart pairs of clearance holes through which threaded shoulder bolts 362a, 362e, respectively, pass for mating with radially spaced apart pairs of tapped holes 162a, 162e, respectively, formed on respective lateral mounting pads 150a, 150e.

First lateral machined pad 350a is further provided with a first fixed pin 363a which mates with a slotted bushing 153a formed on the first lateral mounting pad 150a. Second lateral machined pad 350e is provided with a second fixed pin 363b which mates with a round bushing 153e formed on the second lateral mounting pad 150e. The slot of the slotted bushing 153a extends in a radial direction to facilitate mounting onto the base 110 and accommodate thermal expansion of the fixed segment 202 relative to the base 110.

Figure 7:
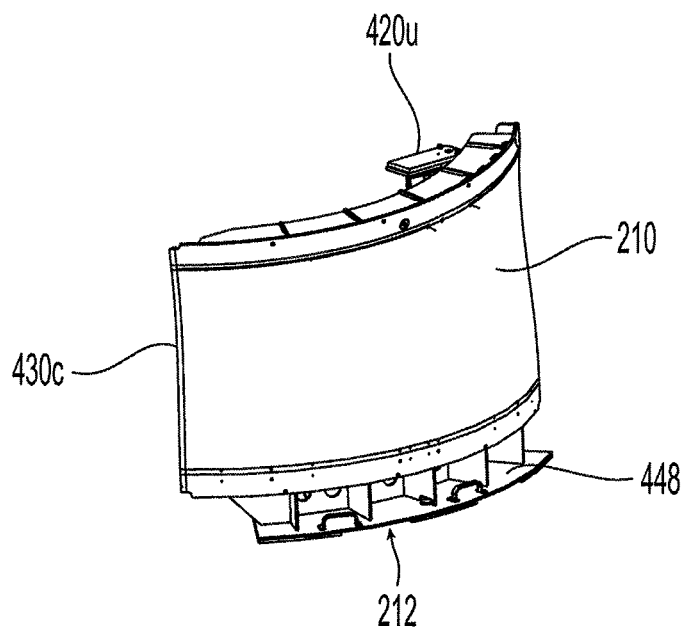
FIG. 7 is an outside view of the first door.
Figure 8:
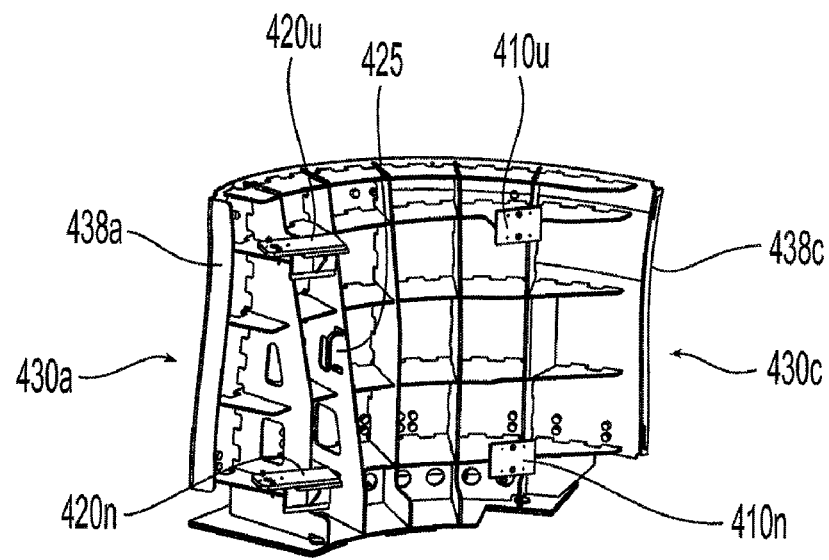
FIG. 8 is an inside view of the first door.
Figure 9:
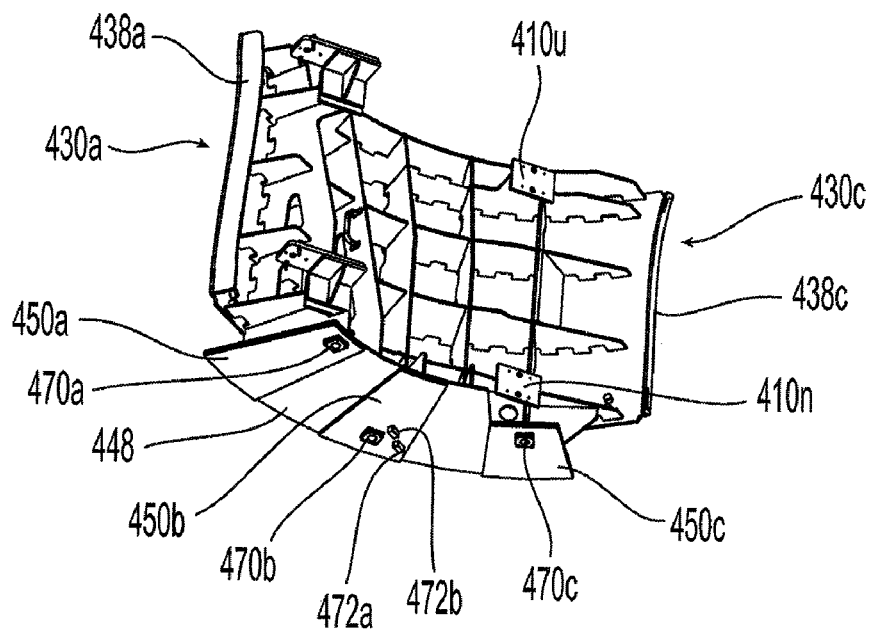
FIG. 9 is an inside view of the first door, looking from below.

FIGS. 7-9 show the first door 210, its first door support 212 and its first door support base 448 in further detail. The first door 210 has a first circumferential end 430a which is opposite the corresponding first circumferential end 330a of the fixed segment 200, and a second circumferential end 430c which is opposite a corresponding first circumferential end 630c of the third door 230, when the tool 100 is in the molding position. The circumferential ends 430a, 430c of the first door 210 are each provided with a circumferentially facing panel 438a, 438c, respectively. In one embodiment, circumferentially facing panel 438c is provided with a sealing structure of the sort described above.

Figure 10:
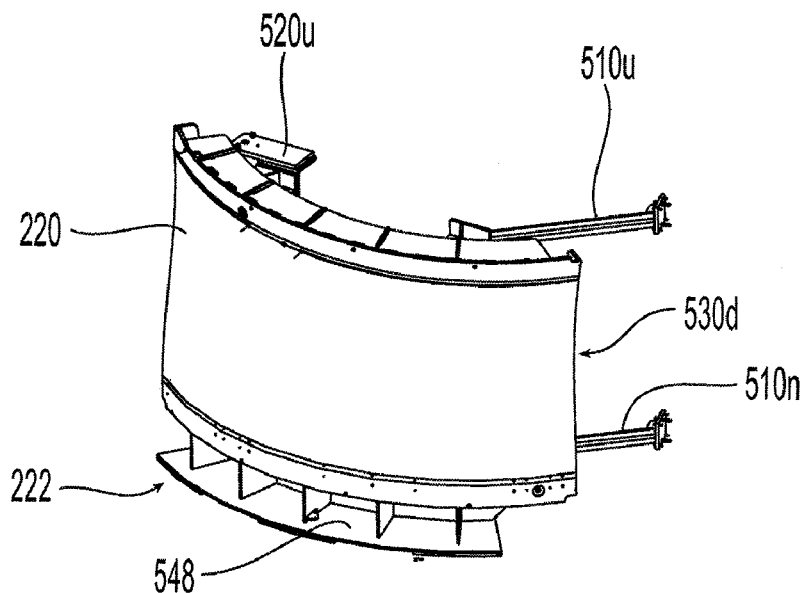
FIG. 10 is an outside view of the second door.
Figure 11:
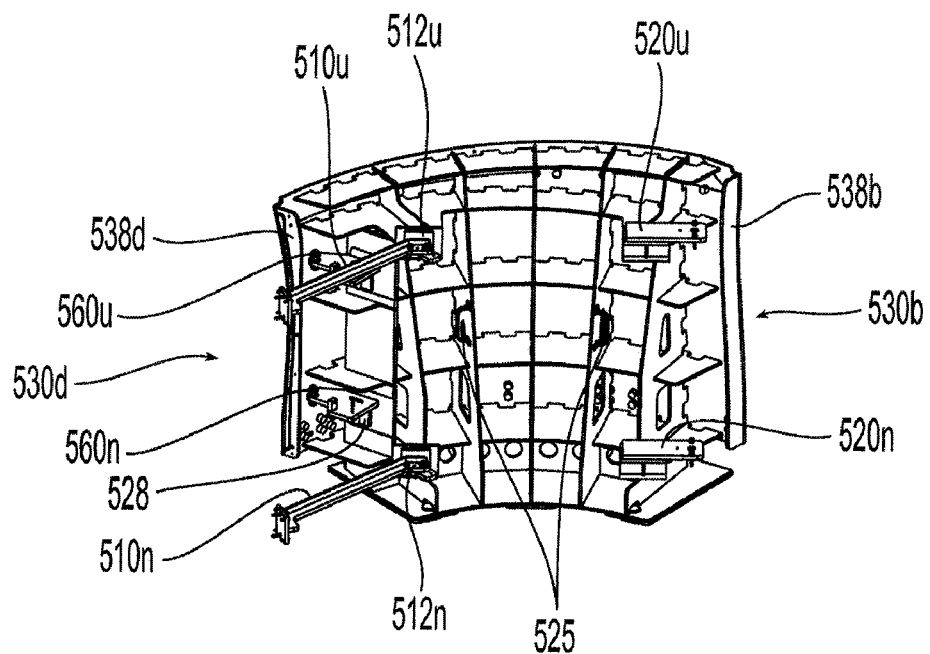
FIG. 11 is an inside view of the second door.

As seen in FIGS. 7 and 8, proximate its first circumferential end 430c, the first door 210 is provided with a pair of vertically spaced apart cross-brace receiver pads 410u, 410n which are configured to serve as rigid mounts and mate with free ends of cross-braces 510u, 510n, respectively (see FIGS. 10 and 11). Proximate its second circumferential end 430a, the first door 210 is provided with a pair of vertically spaced apart hinge arms 420u, 420n, which connect to opposing vertically spaced apart hinge plates 310u, 310n, respectively, formed on the fixed segment 200, as described above. One or more handles 425 is provided on an interior surface of the first door 210 to facilitate grabbing when the first door 210 is to either be pushed out or pulled inwardly, from inside the tool 100.

FIG. 9 shows the details of the first door support 212 and the first door support base 448. The first door support base 448 has a lower surface to which are affixed a plurality of first door pads 450a-c. Each of the first door pads 450a, 450b, 450c is provided with a spherical wheel assembly 470a, 470b, 470c, respectively. When the first door 210 is opened or closed, the wheel assemblies 470a, 470b, 470c roll on first door wear plates 170a, 170b, 170c, respectively, provided on the top surface 192 of the tool base 110 (see FIG. 17A). As seen in FIG. 17A, the first door wear plates 170a, 170b, 170c have differing lengths due to the varying degree of travel experienced by the wheel assemblies when the first door 210 is operated. The spherical wheel assemblies 470a, 470b, 470c and the wear plates 170a, 170b, 170c allow an operator to manually move the first door 210 along an arcuate path by simply pushing or pulling on one or more door handles. It is understood that the wear plates 170a, 170b, 170c are replaceable.

As also seen in FIG. 9, the first door pad 450b is additionally provided with a pair of spaced apart first door stops, including a radially outer first door stop 472a and a radially inner first door stop 472b. The extent of travel of the first door 210 is limited, at least in part, by these first door stops 472a, 472b, when they abut corresponding first door abutments 172a, 172b provided on the top surface 192 of the tool base 110 (see FIG. 17A).

Figure 12:
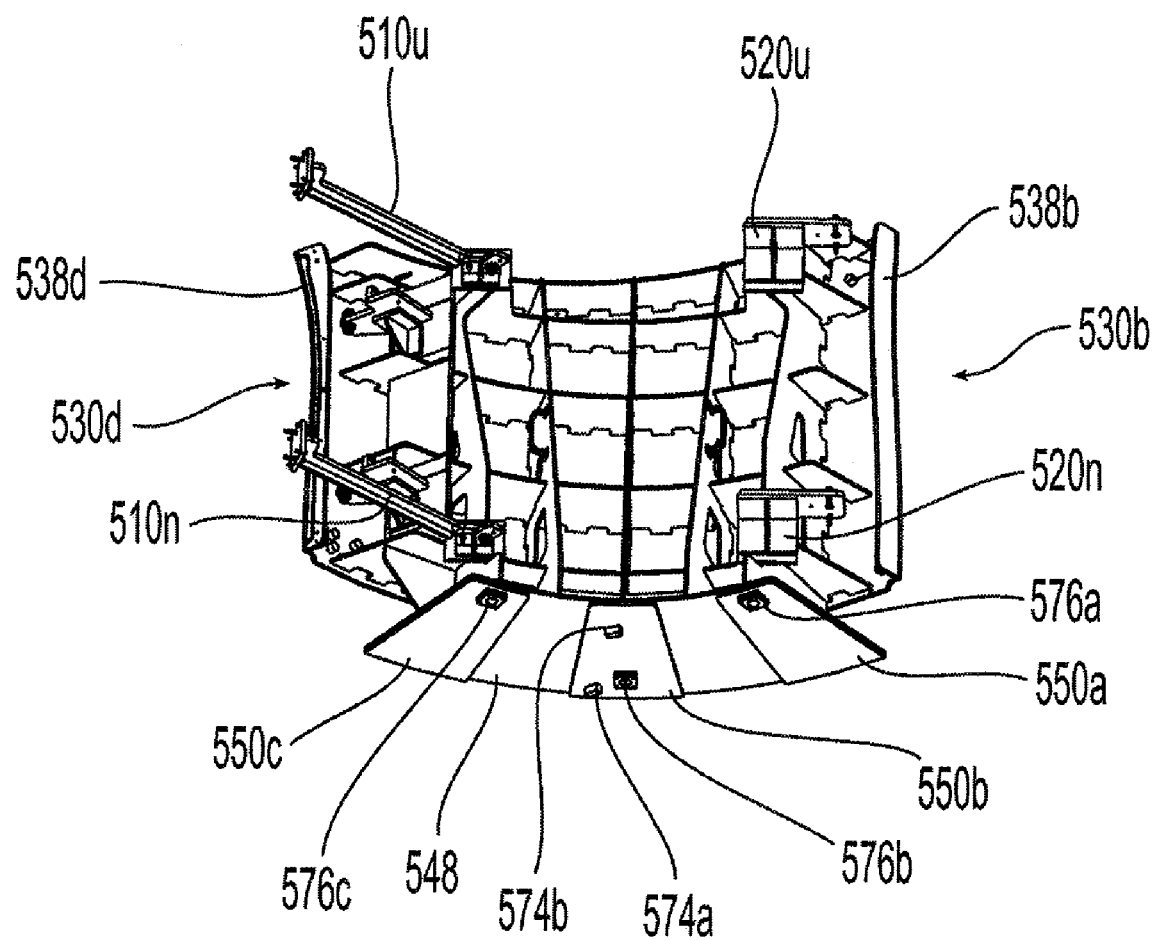
FIG. 12 is an inside view of the second door, looking from below.

FIGS. 10-12 show the second door 220, its second door support 222 and its second door support base 548 in further detail. The second door 220 has a first circumferential end 530b which is opposite the corresponding second circumferential end 330b of the fixed segment 200, and a second circumferential end 530d which is opposite a corresponding second circumferential end 630d of the third door 230, when the tool 100 is in the molding position. The circumferential ends 530b, 530d of the second door 220 are each provided with a circumferentially facing panel 538b, 538d, respectively. In one embodiment, circumferentially facing panel 538d is provided with a sealing structure of the sort described above.

As seen in FIGS. 10 and 11, proximate its first circumferential end 530b, the second door 220 is provided with a pair of vertically spaced apart hinge arms 520u, 520n, which connect to opposing vertically spaced apart hinge plates 320u, 320n, respectively, formed on the fixed segment 200. Proximate its second circumferential end 530d, the second door 220 is provided with a pair of vertically spaced apart third door pivot attachments 560u, 560n for connecting to the third door 230, as discussed below.

Also proximate its second circumferential end 530d, the second door 220 is provided with a pair of vertically spaced apart cross-brace pivotal mounts 512u, 512n around which the cross-braces 510u, 510n, respectively, may pivot. When the tool 100 is in the molding position, the opposite free ends of the cross-braces 510u, 510n are connected to the cross-brace receiver pads 410u, 410n provided on the first door 210 to enhance the structural rigidity of the tool 100 and to prevent accidental opening of the tool 100. Thus, the cross-braces 510u, 510n extend in a lateral direction, parallel to the top surface 192 of the base 110. One or more handles 525 is provided on an interior surface of the second door 220 to facilitate grabbing when the second door 220 is to either be pushed out or pulled inwardly, from inside the tool 100.

FIG. 12 shows the details of the second door support 222 and the second door support base 548. The second door support base 548 has a lower surface to which are affixed a plurality of second door pads 550a-c. Each of the second door pads 550a, 550b, 550c is provided with a spherical wheel assembly 576a, 576b, 576c, respectively. When the second door 220 is opened or closed, the wheel assemblies 576a, 576b, 576c roll on first door wear plates 176a, 176b, 176c, respectively, provided on the top surface 192 of the tool base 110 (see FIG. 17A). As seen in FIG. 17A, the second door wear plates 176a, 176b, 176c have differing lengths due to the varying degree of travel experienced by the wheel assemblies when the second door 220 is operated. However, since the second door 220 opens wider than the first door, the lengths of the second door wear plates 176a, 176b, 176c are longer than the corresponding lengths of the first door wear plates 170a, 170b, 170c. The spherical wheel assemblies 576a, 576b, 576c and the second door wear plates 176a, 176b, 176c allow an operator to manually move the second door 220 along an arcuate path by simply pushing or pulling on one or more door handles 525. It is understood that the wear plates 176a, 176b, 176c are replaceable.

Since the first door 210, the second door 220 and the third door 230 can all be manually operated, no external tooling is needed to move the doors between their open and closed positions.

As also seen in FIG. 12, the second door pad 550b is additionally provided with a pair of spaced apart second door stops, including a radially outer second door stop 574a and a radially inner second door stop 574b. The extent of travel of the second door 220 is limited, at least in part, by these second door stops 574a, 574b, when they abut corresponding second door abutments 174a, 174b provided on the top surface 192 of the tool base 110 (see FIG. 17A).

Figure 13A:
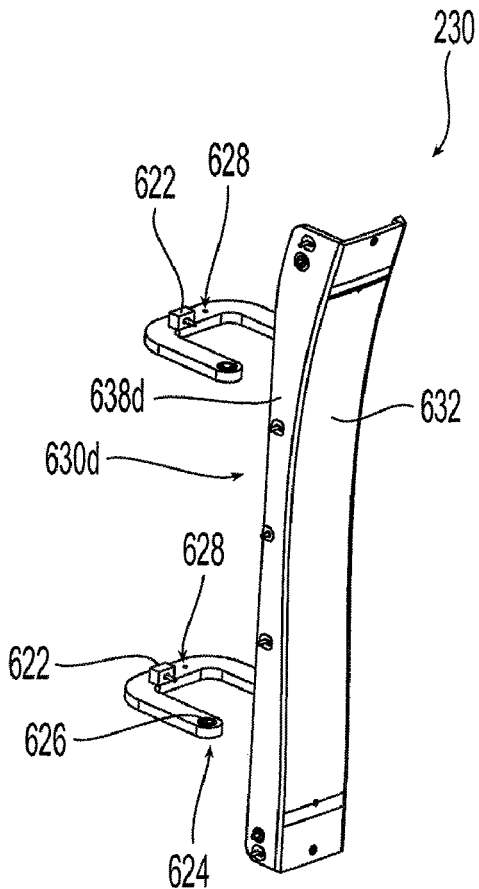
FIG. 13A is an view of the third door showing its exterior surface.
Figure 13B:
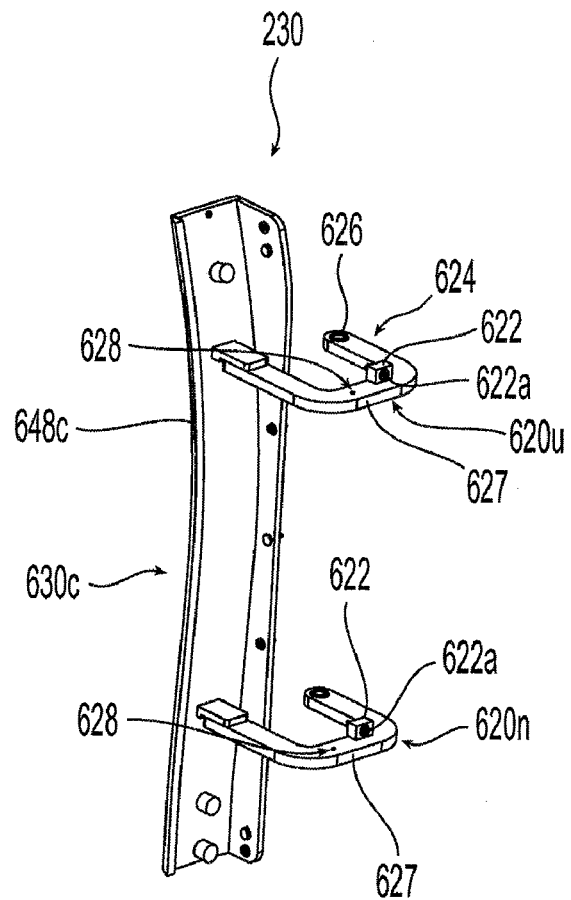
FIG. 13B is an view of the third door showing its interior surface.

FIGS. 13A and 13B show the third door 230. The third door 230 has an exterior surface 632 which conforms to the desired shape of a portion of the part to be made with the tool 100. One circumferential end 630d of the third door 230 is provided with a circumferentially facing panel 638d. When the tool 100 is in the molding position, the third door's circumferentially facing panel 638d opposes the second door's circumferentially facing panel 538d. In contrast, the other circumferential end 630c of the third door 230 is provided with a circumferentially facing edge 648c which is narrower than a width of the circumferentially facing panel 638d. When the tool 100 is in the molding position, the third door's circumferentially facing edge 648c opposes the first door's circumferentially facing panel 438c.

The third door is provided with a pair of vertically spaced apart "goose-neck" or U-shaped hinges 620u, 620n. The U-shaped hinges 620u, 620n are rigidly mounted to the third door 230 on an inner surface thereof. The free ends 624 of the U-shaped hinges 620u, 620n are provided with pivot openings 626 for mounting on the aforementioned vertically spaced apart third door pivot attachments 560u, 560n, each of which is located on a hinge plate 528 of the second door 220 (see FIG. 14B).

The central arm 627 of each U-shaped hinge 620u, 620n is provided with a hinge block 622 and a hinge pin receiving bore 628. Each hinge pinning block 622 cooperates with a corresponding second door block 522 mounted proximate the circumferential second end 530d of the second door 220, as discussed below with respect to FIG. 14B. Each hinge pin receiving bore 628 is configured to receive a hinge pin 636.

Figure 14A:
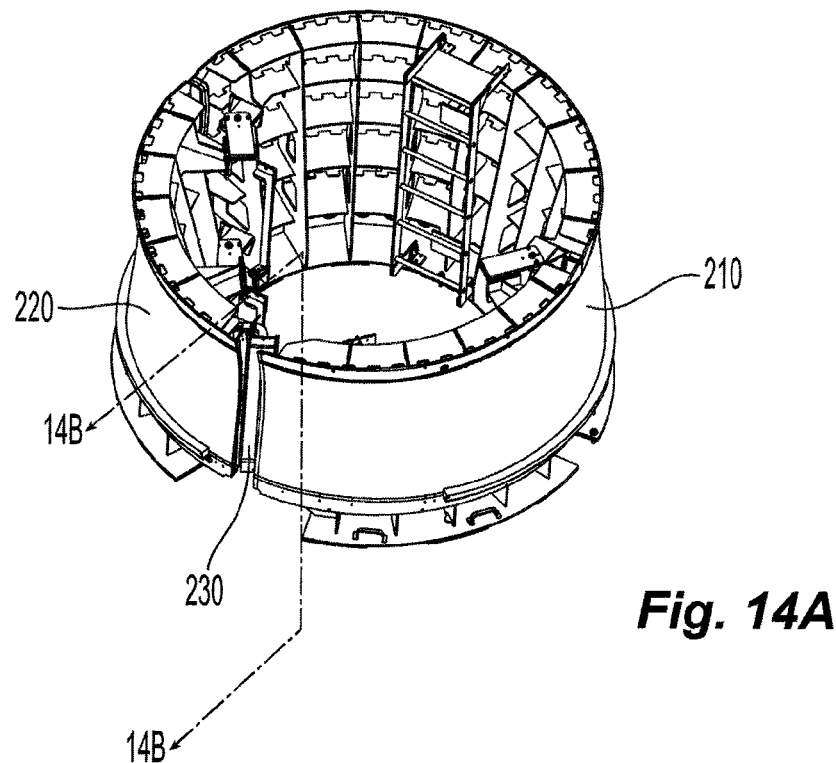
FIG. 14A shows the tool with the third door opened inward.
Figure 14B:
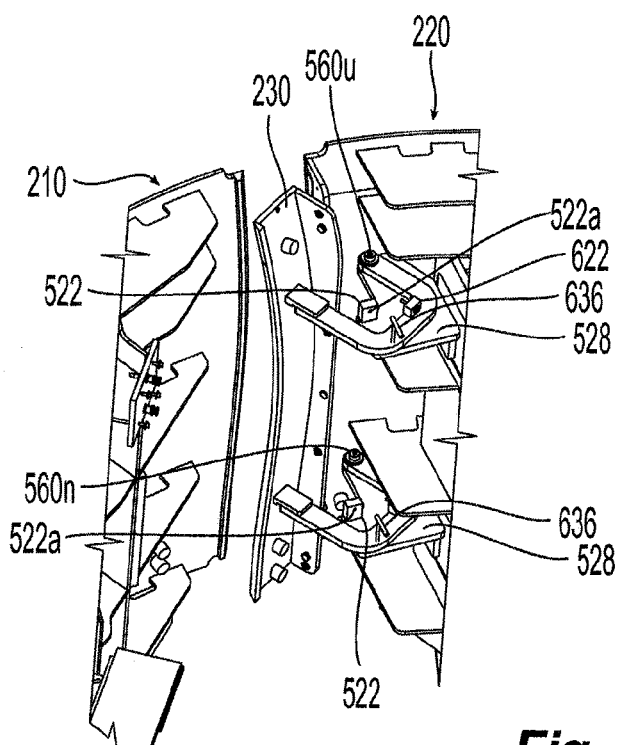
FIG. 14B is a partial view of the tool showing the third door opened inward, as in FIG. 14A.

FIG. 14A shows the tool 100 with the first door 210 and the second door 220 still in the molding position, but with the third door 230 ajar. FIG. 14B shows an enlarged view from the interior of the tool 100 as seen in FIG. 14A, the view taken along cross-sectional line 14B-14B. As seen in FIG. 14B, the third door 230 opens towards the interior of the tool 100 with each U-shaped hinge 620u, 620n passing just above a corresponding hinge plate 528. Each hinge plate 528 carries a second door block 522, a corresponding third door pivot attachment 560u or 560n, and a hinge plate bore (not shown).

When the third door is closed, the hinge pin receiving bore 628 is aligned with a hinge plate bore formed in the hinge plate 528, and the hinge pin 636 may be inserted into the aligned bores to prevent the hinge 620u, 620n from pivoting, i.e., prevent the third door 230 from accidentally opening. Additionally, when the third door 230 is closed, each hinge block 622 is brought into juxtaposition with a corresponding second door block 522, and openings 622a, 522a formed in the respective blocks 622, 522 become aligned. When the blocks 622, 522 are in this position, a bolt may be inserted into the aligned openings 622a, 522a to further secure the third door 230 in the closed position.

The procedure for adjusting the tool 100 from a first position (such as seen in FIGS. 1-2) in which composite material may be applied on an outer surface of the tool to a second position (such as seen in FIG. 3) in which the molded part may be removed after the curing process is given next. From inside the tool: (1) both cross-braces 510u, 510n rigidly connecting the first door 210 and the second door 220 are unbolted; (2) the third door is unpinned (i.e., hinge pin 636 is removed from the aligned openings 622a, 522a); (3) the third door is retracted; (4) the second door 220 is unpinned and retracted; and (5) the first door 210 is unpinned. Then, from outside the tool: (6) the first door 210 is retracted; and (7) any part formed on the tool 100 may then be removed.

Figure 15:
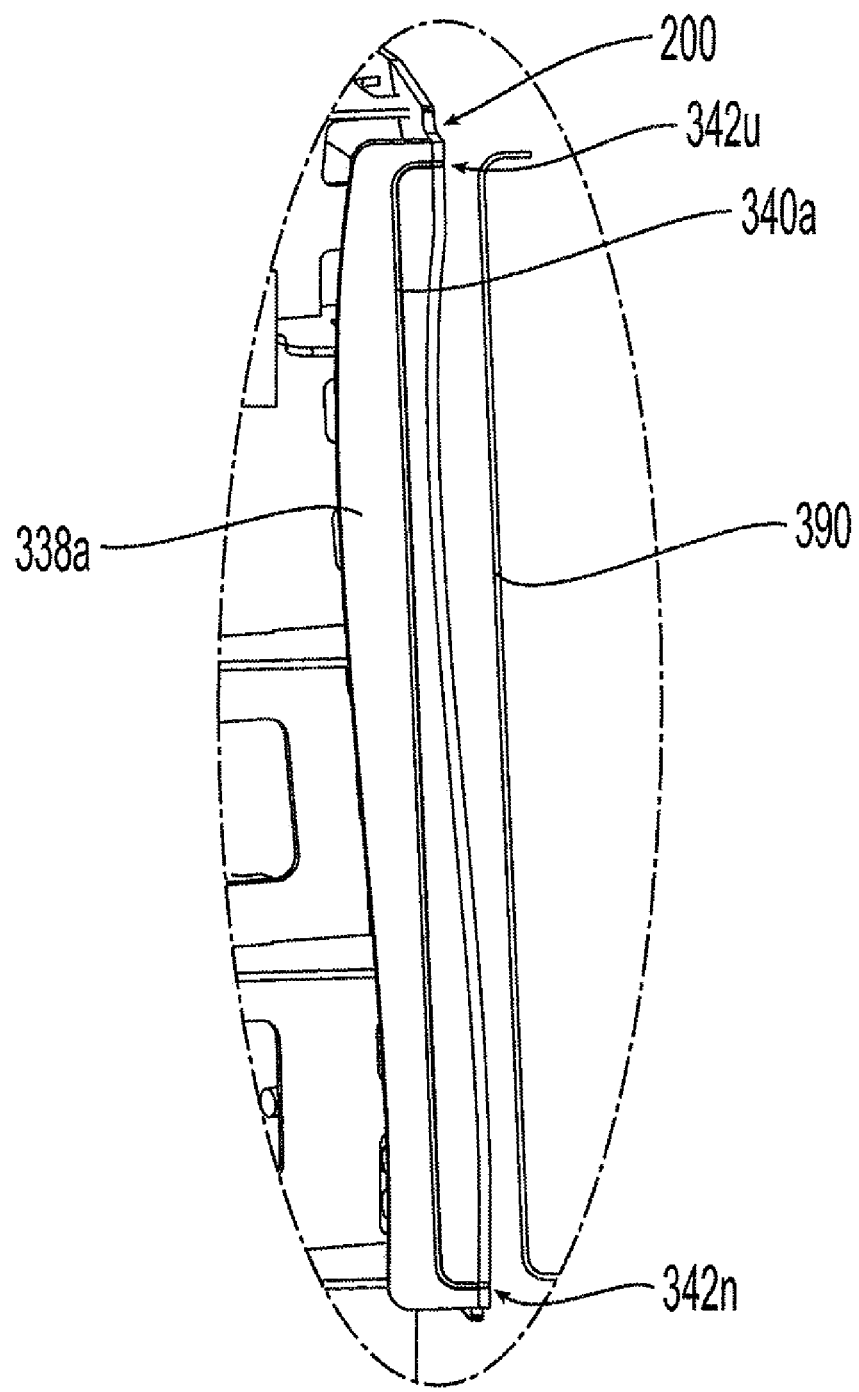
FIG. 15 is a detailed view of a circumferentially facing panel of the fixed segment, showing the groove and the sealing member.

As seen in FIG. 15, an interface panel, such as interface panel 338a is provided with a sealing structure in form of a circumferentially facing groove 340a The groove 340a extends substantially along the entire height of the interface panel 338a and has radially outwardly extending upper and lower groove channels 342u, 342n. The groove 340A is configured and dimensioned to snugly receive an appropriately sized and shaped flexible sealing member 390. In one embodiment, the flexible sealing member comprises a tubular section of flexible material, such as rubber. The sealing structure 340*a* and the flexible sealing member 390 together form a sealing arrangement. When the tool is in the molding portion, this sealing arrangement helps form a seal between adjacent segments. It is therefore understood that the interface between the fixed segment 200 and the first door 210 has such a sealing arrangement, as does the interface between the fixed segment 200 and the second door 210. A similar sealing arrangement is also provided at the interface between the first door 210 and the third door 230, and at the interface between the second door 220 and the third door 230. In one embodiment, as described above, the grooves are formed on both circumferentially facing panels 338*a*, 338*b* of the fixed segment 200, on the first door's circumferentially facing panel 438*c* that faces the third door 230, and on the second door's circumferentially facing panel 538*d* that faces the third door 230.

Figure 16:
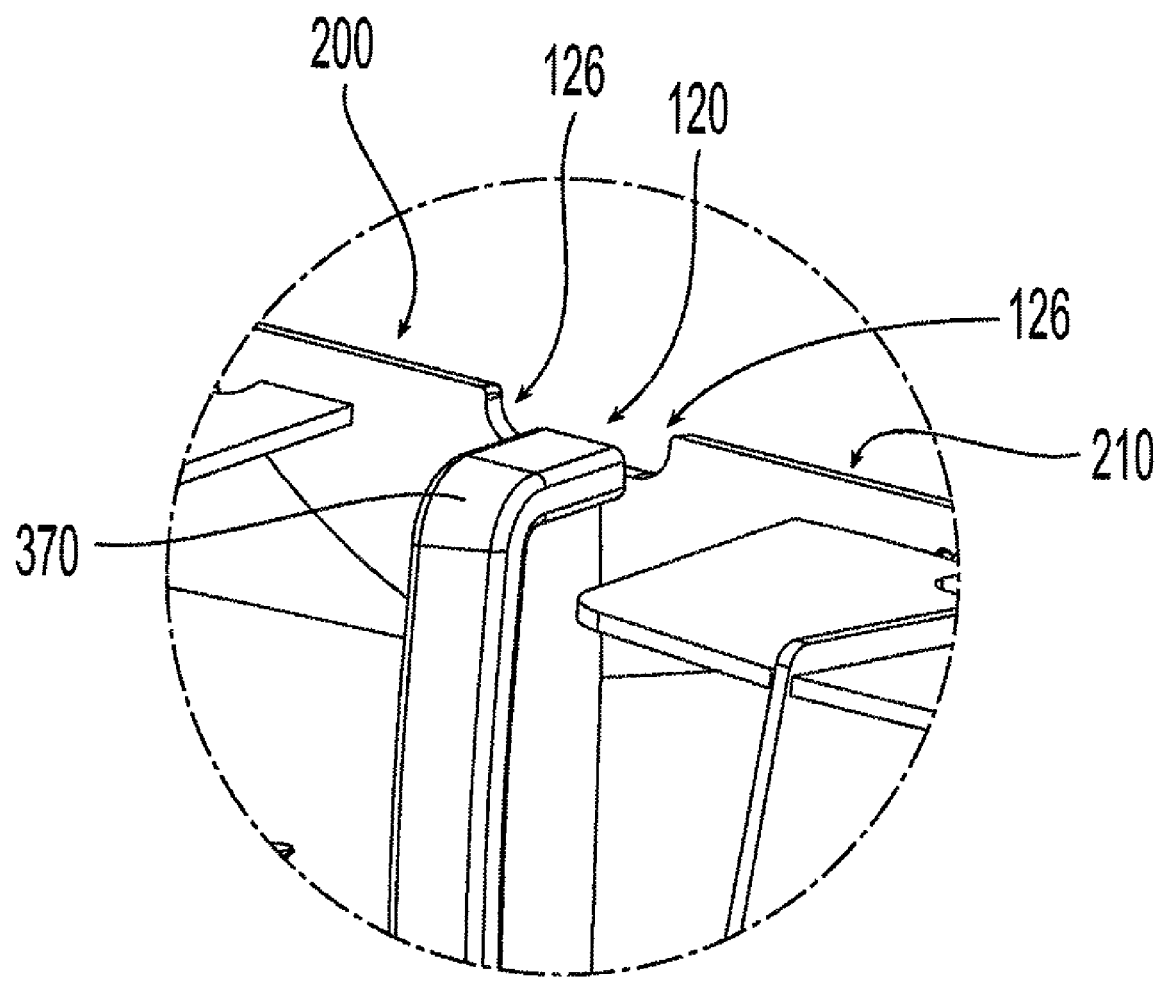
FIG. 16 shows a notch formed at the top of a joint between the fixed segment and a door.

As seen in FIGS. 1 and 16, when the doors 210, 220 are in the closed position, notches 120 are formed between the fixed segment 200 and the first door 210, and also between the fixed segment 200 and the second door 220. Each notch 120 is created when cutouts 126 formed at the top and bottom corners of the fixed segment 200 and at the corresponding facing corners of the doors 210, 220 are brought together when the doors are closed. The notches 120 facilitate the use of vacuum bagging in the event the compressible seals fail. More particularly, the notches are regions where ends of polymer films for vacuum bagging meet to seal the composite material, prior to and during curing, in a manner known to those skilled in the art. A cover member 370 is provided to protect plastic bags during vacuum sealing from sharp edges at the interface between the fixed segment 200 and the first door 210

In the foregoing discussion, one fixed segment and three movable segments in the form of three doors were employed, the smallest door being substantially smaller than either of the other two doors. It is also possible to form a tool with one fixed segment and two movable segments (doors), one door being larger than the other door. In such case, the larger of the two doors is hingedly connected at a first circumferential end to a first circumferential end of the fixed segment. A first circumferential end of the smaller of the two doors is then hingedly connected to the larger door's second circumferential end. In the completed tool, the second circumferential end of the smaller of the two doors meets the second circumferential end of the fixed segment to thereby form the 360° tool. Sealing arrangements including grooves and sealing members as described above may be provided at the three interfaces. In one such three-segment embodiment, the fixed portion may again subtend roughly 180°, the first (larger) hinged door may subtend about 144°-164° and the second (smaller) hinged door (may subtend the remainder of about 16°-36° (or roughly one-quarter to one-tenth the size of the larger door). The non-right-cylindrical geometry of the tool may determine whether or not such a three-segment section is at all possible, and may also help determine the size for the smaller door.

To form a composite tubular structure, the tool 100 is adjusted to the molding position and composite material is applied in a pre-determined horizontal band between the upper and lower edges of the fixed segment 200 and the doors 210, 220, 230. After the composite material has been applied, it is covered with plastic film and vacuum sealed. The plastic film is placed on the outside of the tool over the composite material, and also on the inside of the tool over the interface regions between the various segments 200, 210, 220, 230.

An upper bead of sealant and a lower bead of sealant may be circumferentially applied around the outer surface of the tool 100 to adhere the plastic film to the tool 100. As is known to those skilled in the art, vacuum bag sealant tape (two-sided "chromate tape" with peel-off backing on both sides), such as model no. GS 213-3, available from General Sealants of Industry, Calif. may be suitable for use as sealant beads.

With the beads of sealant applied to secure the plastic film, a first portion of polymer film, such as a nylon film, may then be placed on the outer surface of the tool 100. This first portion of film is a single piece that extends around the entire circumference of the tool and is overlapped in the circumferential direction by 2-3 centimeters or so, the overlapping ends secured by an axially extending piece of chromate tape. This first portion of nylon film is of sufficient height to contact the upper and lower beads. Preferably, the upper edge of the nylon film extends above the upper bead around the entire circumference of the tool, while the lower edge of the first portion of nylon film extends below the lower bead around the entire circumference of the tool. The first portion of the film also extends across each notch 120, and is secured to those portions of the beads that extend across each notch. In one embodiment, an IPPLON® KM 1300 nylon film, available from Airtech International, Inc. of Huntington Beach, Calif. may be used.

Second portions of nylon film, which are sized to cover each of the interface regions between the segments may optionally be applied on the inside surface of the tool 100 and are secured to the first portion of nylon film via beads at the notches, in a known manner. As a result, the first film portion and the second film portion may sealingly join and engage each other. This serves as a backup in case the sealing members 390 fail. In this manner, a vacuum bag is formed, the vacuum bag creating a seal around the interface regions and the adjoining areas where the edges of the segments 200, 210, 220, 230 are present.

Figure 18:
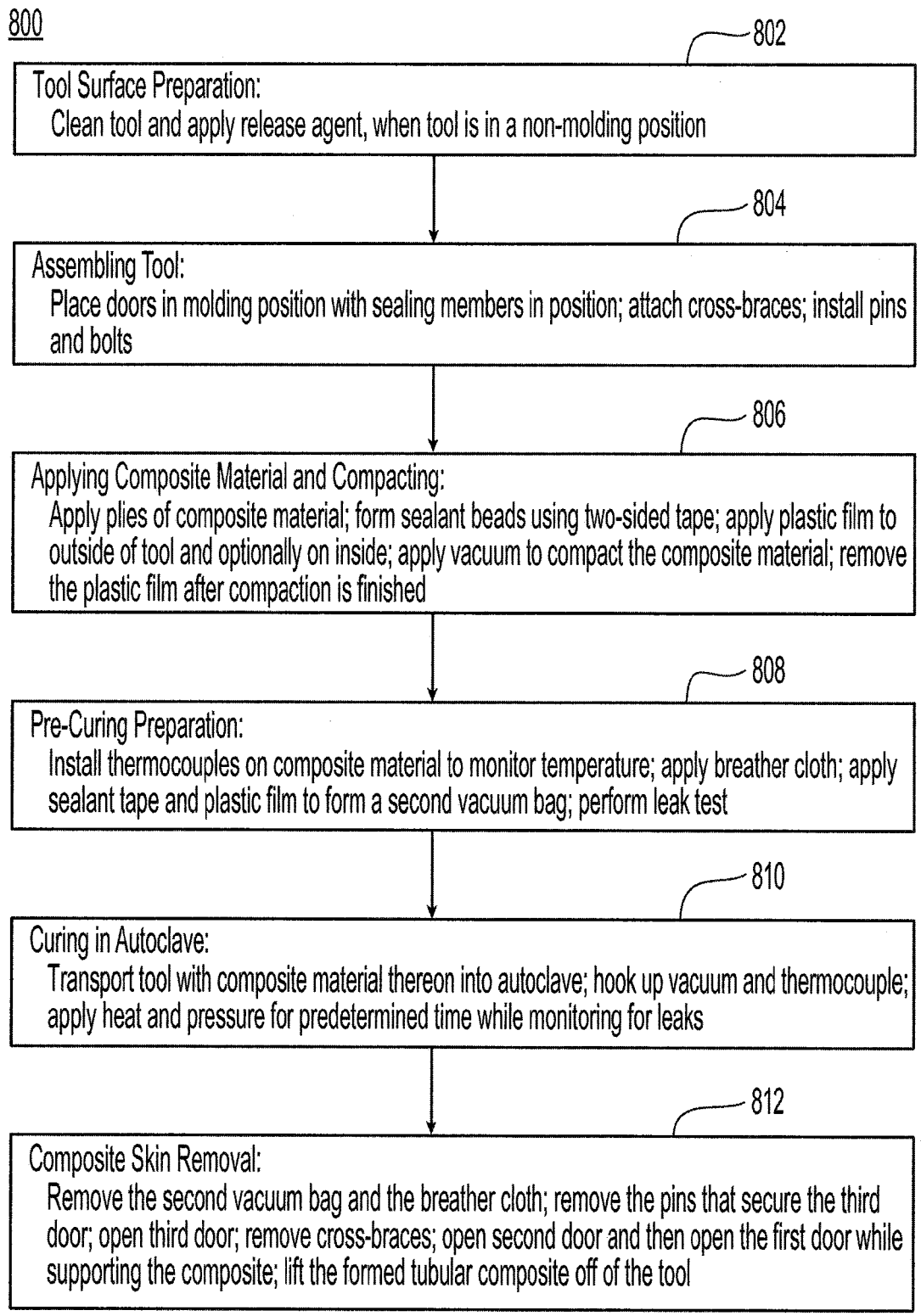
FIG. 18 shows the principal steps in an exemplary process for making a tubular composite using the tool of FIG. 1.

An exemplary use of the tool 100 is presented next with reference to FIG. 18. This exemplary use illustrates one embodiment of a process 800 for making a composite inner skin of a 360° acoustic inner barrel for a nacelle inlet, using the tool 100. The process entails a number of phases: tool surface preparation 802; tool assembly 804; application of composite material 806; preparation for curing 808; curing in an autoclave 810; and composite inner skin removal 812. People skilled in the art are familiar with these processes, as evidenced by aforementioned U.S. Published Application No. 2007/0062022.

First, the tool surface is prepared, in a known manner. The tool surface preparation process 802 entails:

(1) Adjusting the tool into a non-molding position (if not already done);
(2) Cleaning the tool with a solvent; and
(3) Applying a release agent, such as FREEKOTE™ to the outer surfaces of the segments.

Next, the tool is assembled and configured for use. As seen in FIG. 18, the tool assembly process 804 entails:

(1) Closing the first door 210 and installing pins to secure the first door 210 relative to the base 110.
(2) Closing the second door 210 and installing pins to secure the second door 220 relative to the base 110.
(3) Attaching the cross-braces 510*u*, 510*n* on the second door 220 to the cross-brace pads 410*u*, 410*n* provided on the first door; and
(4) Closing the third door 230 and installing the hinge pin 636.

After the tool 100 is assembled, composite material is applied to the external surface of the tool in a conventional lay-up process and compacted by vacuum. The composite material application and compaction process 806 entails:

(1) Laying on plies of composite material in the form of graphite-epoxy prepreg fabric on the tool's outer surface. Segments of the fabric about 1.1 meters in height, each circumferentially subtending about 60°, are placed on the outer surface of the tool, adjacent segments overlapping one another by about 2-3 cm. No tape or adhesives are used to secure overlapping fabric segments since they may contaminate the final composite structure. About 3 or 4 such plies are laid on at a time;

(2) Applying two-sided vacuum bag sealant tape around the top and bottom peripheries of the outer surface of the tool and along the interface areas on the inner surface of the tool to form the sealant bead. The two-sided tape is applied to the outer surface of the tool, and not to the surface of the composite material. On the outer surface of the tool, a gap of about 13 to 18 cm is left between the circumferentially extending upper and lower edges of the composite material and the circumferentially extending upper and lower sealant beads;

(3) Applying polymer film to form a first vacuum bag around the fabric and along the interface areas. A first portion of polymer film is wrapped around the circumference of the tool such that it contacts and seals against the upper lower beads of sealant tape in the manner described above. Additionally, second portions of polymer film may optionally be applied to form a seal with a corresponding one of the tape beads that extend around each interface area on the inside surface of the tool, in the manner described above. In such case, the first portion of polymer film sealingly engages the second portions of polymer film at each notch pair;

(4) Compacting the plies against the tool surface by applying a vacuum to the first vacuum bag. A metal fitting is installed on the vacuum bag, such as by taping with sealant tape, a first end of a hose is connected to the fitting and a second end of the hose is connected to a vacuum pump. The suction exerted by the vacuum pump is sufficient to compact the composite material. Therefore, no mechanical pressure other than that provided by the plastic film of the vacuum bag pressing against the composite material is needed to perform the compaction; and (5) After compacting for 20-30 minutes, releasing the vacuum and removing the first vacuum bag and sealant tape. At this point, the composite materials have been compacted.

Next, in a pre-curing phase 808, the tool with the compacted fabric thereon is prepared for the autoclave. Preparation for curing entails:

(1) Installing thermocouples on the tool and on the composite material to monitor the curing process;

(2) Applying breather cloth over the compacted composite material. In a preferred embodiment, the breather cloth is a nylon mat, such as Model No. Ultraweave 1332, available from Airtech International of Huntington Beach, Calif.;

(3) Applying a fresh layer of two-sided vacuum bag sealant tape and polymer film to form a second vacuum bag in the same manner as described above with respect to the first vacuum sealant bag. The second vacuum bag is formed over the breather cloth which itself covers the compacted composite material; and (4) Applying vacuum to the second vacuum bag and performing a leak test by applying a vacuum and gauging the pressure to determine whether a leak is present.

After this, the tool, with the composite materials applied thereon, along with the breather cloth, is cured in an autoclave. The autoclave curing phase 810 entails:

(1) Moving the tool 100 into the autoclave and hooking up vacuum and thermocouple connections;

(2) Closing the autoclave door and running through a predetermined heat and pressure cycle to cure the composite. The vacuum bag remains under vacuum until the autoclave pressure is high enough above atmospheric pressure, at which point the vacuum bag is vented to atmospheric pressure. The bag is monitored to ensure that it does not go to positive pressure during the cure cycle, positive pressure indicating a leak; and (3) Opening the autoclave and removing the tool 100 with the tubular composite formed thereon.

After curing in the autoclave, the composite inner skin is removed from the tool 100. The composite inner skin removal process 812 entails:

(1) Removing the vacuum bag and the breather cloth;

(2) Removing the hinge pins 636 and opening the third door 230;

(3) Detaching the cross-braces 510*u*, 510*n* between the first and second doors;

(4) Removing pins and opening the second door 220 from the inside;

(5) Removing pins and opening the first door 210 from the outside;

(6) Lifting the composite inner skin of the tool from the tool 100.

It is understood that there may be other steps in each of the above-described phases. It is also understood that the some of the steps in one or more of the above-described phases may be taken out of the sequence presented above.

Once the composite inner skin is formed, it generally is subject to additional processing, such as perforation for acoustic attenuation. This, however, is done by a separate process using separate tools. The acoustic core and the outer skin are also formed using separate processes and separate tools.

Figure 19:
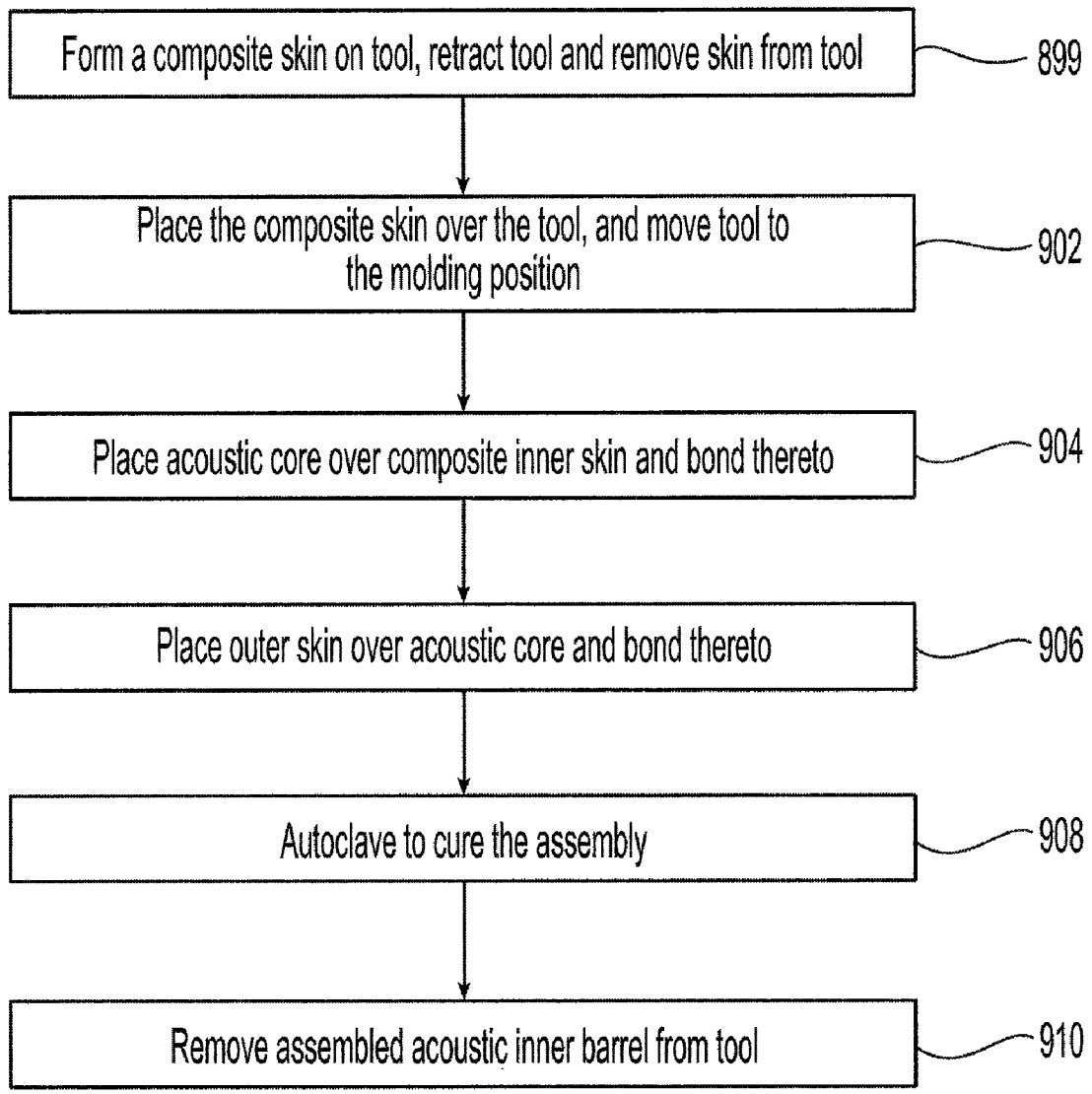
FIG. 19 shows the principal steps for using the tool of FIG. 1 to assemble an acoustic inner barrel using the tubular composite.

A bond panel for an acoustic inner barrel may be formed by bonding together the composite inner skin, the acoustic core and the outer skin, with help of the tool 100. FIG. 19 shows a process 900 to accomplish this. First, in step 902, the composite inner skin is placed over a slightly collapsed tool 100 and the tool is then adjusted to the molding position such that the outer surface of the tool supports the inner skin. As indicated by preliminary step 899, the composite inner skin may first have been molded on the tool, the doors 210, 220, 230 opened and the composite inner skin removed from the tool 100, and only then subsequently repositioned on the tool 100. Next, in step 904, the acoustic core (e.g., honeycomb core typically used in engine nacelles) is positioned over the composite inner skin and bonded thereto. After this, in step 906, the outer skin is positioned over the acoustic core and bonded thereto. In step 908, the resulting assembly is then cured in an autoclave. Finally, in step 910, the bonded inner skin/core/outer skin assembly is removed from the tool. People skilled in the art understand how to bond adjacent layers for such an acoustic liner.

While the present invention has been described herein above in connection with a plurality of aspects and embodiments, it is understood that these aspects and embodiments were presented by way of example with no intention of limiting the invention. Accordingly, the present invention should not be limited to any specific embodiment or aspect, but rather construed in breadth and broad scope in accordance with the recitation of the claims appended hereto.

What is claimed is:

1. A 360° tool for making a 360° composite tubular structure, the tool being adjustable between a molding position and a non-molding position, the tool comprising:
a base;
at least one fixed segment that is fixed relative to the base, the at least one fixed segment having a first circumferential end and a second circumferential end;
a first door having a first circumferential end hingedly connected to the first circumferential end of the at least one fixed segment;
a second door having a first circumferential end hingedly connected to the second circumferential end of the at least one fixed segment;
a third door hingedly connected to the second door and configured to fit between the second door and first door and complete the 360° circumferential extent of the tool; and
a sealing member between the at least one fixed segment and each of the first and second doors and also between each of the first and second doors and the third door; wherein:
the third door has a circumferential extent no greater than one-quarter of a circumferential extent of the smaller of the first and second doors, and wherein the first door, the second door and the third door are manually operable without external tooling being needed to move any of the doors between an open position and a closed position.

2. The 360° tool according to claim 1, wherein:
the third door has a circumferential extent no greater than one-tenth a circumferential extent of the smaller of the first and second doors.

3. The 360° tool according to claim 2, wherein:
the first and second doors each have a circumferential extent of about 87°; and
the third door has a circumferential extent of about 6°.

4. The 360° tool according to claim 1, further comprising:
at least one cross brace extending laterally between the first door and the second door to thereby enhance structural rigidity of the tool, when the tool is in the molding position.

5. The 360° tool according to claim 4, comprising:
a pair of spaced apart, laterally extending cross-braces extending between the first and second doors, when the tool is in the molding position.

6. The 360° tool according to claim 5, wherein:
the cross-braces extend parallel to the base, between the first and second doors, when the tool is in the molding position.

7. The 360° tool according to claim 5, wherein:
the cross-braces extend between respective pivotal mounts formed on one of the first and second doors, and corresponding rigid mounts formed on the other of the first and second doors.

8. The 360° tool according to claim 1, wherein:
the first and second doors are each provided with a plurality of wheels to facilitate opening and closing; and
an upper surface of the base is provided with a plurality of replaceable wear plates on which said plurality of wheels travel, during articulation of the first and second doors.

9. The 360° tool according to claim 1, wherein:
each sealing member is located on a circumferentially facing portion of the fixed segment or of one of the doors.

10. The 360° tool according to claim 9, wherein:
each sealing member is received into a groove formed in a corresponding circumferentially facing portion.

11. The 360° tool according to claim 10, wherein:
the fixed segment is provided with two grooves;
the first and second doors are each provided with a groove; and
each groove receives a corresponding sealing member.

12. The tool according to claim 1, comprising:
a first pair of cutouts formed in the upper facing corners of the first door and the fixed segment; and
a second pair of cutouts formed in the upper facing corners of the second door and the fixed segment; wherein:
each pair of cutouts cooperates to form a notch, when the tool is in the molding position.

13. The 360° tool according to claim 1, wherein:
the base is formed of steel and has a first thermal coefficient of expansion; and
the fixed segment and the first, second and third doors have a second thermal coefficient of expansion which is similar to a thermal coefficient of expansion of a graphite-epoxy composite.

14. A 360° tool for making a 360° composite tubular structure, the tool being adjustable between a molding position and a non-molding position, the tool comprising:
a base;
at least one fixed segment that is fixed relative to the base, the at least one fixed segment having a first circumferential end and a second circumferential end;
a first door having a first circumferential end hingedly connected to the first circumferential end of the at least one fixed segment;
a second door hingedly connected to the first door and configured to fit between the first door and the second circumferential end of the fixed segment to thereby complete the 360° circumferential extent of the tool; and
a sealing member between the at least one fixed segment and each of the first and second doors and also between the first door and the second door; wherein:
the second door has a circumferential extent no greater than one-quarter of a circumferential extent of the first door, and wherein the first door and the second door are manually operable without external tooling being needed to move any of the doors between an open position and a closed position.

15. The 360° tool according to claim 14, wherein:
the first door and the second door are manually operable without external tooling being needed to move any of the doors between an open position and a closed position.

16. The 360° tool according to claim 14, wherein:
a set of wheels is attached to a bottom of the base to help roll the base along a floor or other surface on which the base rests; and
the base is provided with forklift receiving structures suitable for receiving forklift prongs, to facilitate lifting and transporting the base.

17. The 360° tool according to claim 1, wherein: p1 the first door, the second door and the third door are manually operable without external tooling being needed to move any of the doors between an open position and a closed position.

18. The 360° tool according to claim 1, wherein:
a set of wheels is attached to a bottom of the base to help roll the base along a floor or other surface on which the base rests; and
the base is provided with forklift receiving structures suitable for receiving forklift prongs, to facilitate lifting and transporting the base.

* * * * *

UNITED STATES PATENT AND TRADEMARK OFFICE
CERTIFICATE OF CORRECTION

| | | |
|---|---|---|
| PATENT NO. | : 7,640,961 B2 | |
| APPLICATION NO. | : 12/052968 | |
| DATED | : January 5, 2010 | |
| INVENTOR(S) | : Steve Stubner et al. | |

It is certified that error appears in the above-identified patent and that said Letters Patent is hereby corrected as shown below:

Col. 13; Claim 1, line 25, "the first and second doors" should read --the first and second doors, and wherein each of the doors is manually operable from inside the tool by pushing out or pulling inwardly.--.

Col. 14; Claim 14, line 38, "circumferential extent of the first door" should read --circumferential extent of the first door, and wherein each of the doors is manually operable from inside the tool by pushing out or pulling inwardly.--.

Col. 14; Claim 17, line 54, "wherein p1 the first door" should read --wherein the first door--.

Signed and Sealed this
Nineteenth Day of April, 2011

David J. Kappos
*Director of the United States Patent and Trademark Office*